(12) United States Patent
Kim et al.

(10) Patent No.: US 11,999,823 B2
(45) Date of Patent: *Jun. 4, 2024

(54) POLYIMIDE-BASED POLYMER FILM, SUBSTRATE FOR DISPLAY DEVICE, AND OPTICAL DEVICE USING THE SAME

(71) Applicant: LG CHEM, LTD., Seoul (KR)

(72) Inventors: Kyunghwan Kim, Daejeon (KR); Jiyeon Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 601 days.

This patent is subject to a terminal disclaimer.

(21) Appl. No.: 17/059,644

(22) PCT Filed: Jan. 28, 2020

(86) PCT No.: PCT/KR2020/001265
§ 371 (c)(1),
(2) Date: Nov. 30, 2020

(87) PCT Pub. No.: WO2020/159184
PCT Pub. Date: Aug. 6, 2020

(65) Prior Publication Data
US 2021/0206921 A1  Jul. 8, 2021

(30) Foreign Application Priority Data

| Feb. 1, 2019 | (KR) | 10-2019-0013486 |
| Sep. 30, 2019 | (KR) | 10-2019-0121176 |
| Sep. 30, 2019 | (KR) | 10-2019-0121177 |
| Sep. 30, 2019 | (KR) | 10-2019-0121178 |
| Dec. 6, 2019 | (KR) | 10-2019-0161494 |
| Dec. 6, 2019 | (KR) | 10-2019-0161495 |

(51) Int. Cl.
| *C08G 73/10* | (2006.01) |
| *C08G 73/14* | (2006.01) |
| *C08J 5/18* | (2006.01) |
| *C08L 79/08* | (2006.01) |
| *G02B 1/04* | (2006.01) |
| *G02F 1/1333* | (2006.01) |

(52) U.S. Cl.
CPC ..... *C08G 73/1067* (2013.01); *C08G 73/1007* (2013.01); *C08G 73/1039* (2013.01); *C08G 73/1042* (2013.01); *C08G 73/1078* (2013.01); *C08G 73/1082* (2013.01); *C08G 73/14* (2013.01); *C08J 5/18* (2013.01); *C08L 79/08* (2013.01); *G02B 1/04* (2013.01); *G02F 1/133305* (2013.01); *C08J 2379/08* (2013.01); *C08L 2201/08* (2013.01); *C08L 2203/16* (2013.01); *C08L 2203/20* (2013.01); *C09K 2323/00* (2020.08); *C09K 2323/027* (2020.08); *G02F 2202/022* (2013.01)

(58) Field of Classification Search
CPC ............ C08G 73/1067; C08G 73/1007; C08G 73/1039; C08G 73/1042; C08G 73/1078; C08G 73/1082; C08G 73/14; C08J 5/18; C08J 2379/08; C08L 79/08; C08L 2201/08; C08L 2203/16; C08L 2203/20; G02B 1/04; G02F 1/133305; G02F 2202/022; C09K 2323/00; C09K 2323/027

See application file for complete search history.

(56) References Cited

U.S. PATENT DOCUMENTS

| 5,115,090 A | 5/1992 | Sachdev et al. |
| 5,272,247 A | 12/1993 | Sotokawa et al. |
| 8,318,315 B2 | 11/2012 | Yoo et al. |
| 10,144,847 B2 | 12/2018 | Yun et al. |
| 10,647,883 B2 | 5/2020 | Yun et al. |
| 2004/0087620 A1 | 5/2004 | Tsuri et al. |
| 2014/0228512 A1 | 8/2014 | Chou et al. |
| 2015/0011726 A1 | 1/2015 | Hasegawa et al. |
| 2015/0158980 A1 | 6/2015 | Oka et al. |
| 2017/0218200 A1 | 8/2017 | Ahn et al. |
| 2019/0048141 A1 | 2/2019 | Yun et al. |
| 2020/0062906 A1 | 2/2020 | Jeong et al. |
| 2020/0095376 A1 | 3/2020 | Yun et al. |

FOREIGN PATENT DOCUMENTS

| CN | 103319714 A | 9/2013 | |
| CN | 104508009 A | 4/2015 | |
| CN | 108026273 A | 5/2018 | |
| CN | 108431088 A | 8/2018 | |
| CN | 108699242 A | 10/2018 | |
| CN | 108864426 A | 11/2018 | |
| JP | S60-221426 A | 11/1985 | |
| JP | 04077587 A | * 3/1992 | |
| JP | H04-224824 A | 8/1992 | |
| JP | 05065342 A | * 3/1993 | ............ C08G 73/10 |

(Continued)

OTHER PUBLICATIONS

Machine translation of Yun et al. (KR 10-1796875 B1) (Year: 2017).*
International Search Report for PCT/KR2020/001265 dated May 8, 2020, 4 pages.
International Search Report for PCT/KR2020/001263 dated May 21, 2020, 4 pages.

(Continued)

*Primary Examiner* — John D Freeman
(74) *Attorney, Agent, or Firm* — ROTHWELL, FIGG, ERNST & MANBECK, P.C.

(57) ABSTRACT

The present disclosure relates to a polyimide-based resin film which is synthesized by the reaction of an acid anhydride compound and a diamine compound having a specific structure, a substrate for display device, and an optical device using the same.

13 Claims, No Drawings

(56) References Cited

FOREIGN PATENT DOCUMENTS

| | | | |
|---|---|---|---|
| JP | 05112644 A * | 5/1993 | |
| JP | H11-236448 A | 8/1999 | |
| JP | 2005-306983 A | 11/2005 | |
| JP | 2010-235641 A | 10/2010 | |
| JP | 2010235641 A * | 10/2010 | |
| JP | 2013-001899 A | 1/2013 | |
| JP | 2013069505 A * | 4/2013 | |
| JP | 2013-137334 A | 7/2013 | |
| JP | 2014-77091 A | 5/2014 | |
| JP | 2016-120629 A | 7/2016 | |
| JP | 2017133012 A | 8/2017 | |
| JP | 2019-503412 A | 2/2019 | |
| KR | 10-2009-0066399 A | 6/2009 | |
| KR | 10-1545666 B1 | 8/2015 | |
| KR | 10-2016-0097682 A | 8/2016 | |
| KR | 10-2016-0138980 A | 12/2016 | |
| KR | 20160147837 A | 12/2016 | |
| KR | 10-2017-0076101 A | 7/2017 | |
| KR | 10-2017-0114366 A | 10/2017 | |
| KR | 10-2017-0131514 A | 11/2017 | |
| KR | 10-1796875 B1 | 11/2017 | |
| KR | 10-2018-0032787 A | 4/2018 | |
| KR | 10-2018-0033739 A | 4/2018 | |
| KR | 10-2018-0048605 A | 5/2018 | |
| KR | 10-2018-0081434 A | 7/2018 | |
| KR | 10-2018-0096151 A | 8/2018 | |
| KR | 10-2018-0110632 A | 10/2018 | |
| KR | 10-2019-0038268 A | 4/2019 | |
| TW | 201345952 A | 11/2013 | |
| TW | 201431907 A | 8/2014 | |
| TW | 201718714 A | 6/2017 | |
| TW | 201813992 A | 4/2018 | |
| WO | 2002-057216 A1 | 7/2002 | |
| WO | 2013-154141 A1 | 10/2013 | |
| WO | 2015-152178 A1 | 10/2015 | |
| WO | 2016-088641 A1 | 6/2016 | |
| WO | 2017-111300 A1 | 6/2017 | |
| WO | 2018-056573 A1 | 3/2018 | |
| WO | 2018-070398 A1 | 4/2018 | |
| WO | 2018-097143 A1 | 5/2018 | |
| WO | 2018-143588 A1 | 8/2018 | |

OTHER PUBLICATIONS

International Search Report for PCT/KR2020/001291 dated May 21, 2020, 4 pages.
International Search Report for PCT/KR2020/001250 dated May 8, 2020, 4 pages.

* cited by examiner

POLYIMIDE-BASED POLYMER FILM, SUBSTRATE FOR DISPLAY DEVICE, AND OPTICAL DEVICE USING THE SAME

CROSS-REFERENCE TO RELATED APPLICATION(S)

This application is a 35 U.S.C. 371 National Phase Entry Application from PCT/KR2020/001265, filed on Jan. 28, 2020, designating the United States, which claims the benefit of priority from Korean Patent Application No. 10-2019-0013486 filed on Feb. 1, 2019; Korean Patent Application No. 10-2019-0121176 filed on Sep. 30, 2019; Korean Patent Application No. 10-2019-0121177 filed on Sep. 30, 2019; Korean Patent Application No. 10-2019-0121178 filed on Sep. 30, 2019; Korean Patent Application No. 10-2019-0161494 filed on Dec. 6, 2019; and Korean Patent Application No. 10-2019-0161495 filed on Dec. 6, 2019 in the Korean Intellectual Property Office, the disclosures of which are incorporated herein by reference in their entirety.

The present disclosure relates to a polyimide-based resin film that has high heat resistance and can realize excellent optical properties and dimensional stability, a substrate for display device and an optical device using the same.

BACKGROUND OF THE INVENTION

The display device market is rapidly changing based on flat panel displays (FPDs) that are easy to fabricate over a large area and can be reduced in thickness and weight. Such flat panel displays include liquid crystal displays (LCDs), organic light emitting displays (OLEDs), or electrophoretic devices.

In line with recent efforts to further extend the application and use of flat panel displays, particular attention has focused on so-called flexible display devices in which flexible substrates are applied to flat panel displays. The application of such flexible display devices is particularly reviewed based on mobile devices such as smart phones and the application fields thereof are gradually extended.

In general, in manufacturing a flexible display device and an illumination device, a TFT device is manufactured by forming a multilayer inorganic film such as a buffer layer, an active layer, and a gate insulator on the cured polyimide.

However, when light is emitted to the polyimide layer (substrate layer), the emission efficiency may be reduced due to the difference between the refractive index of the multilayer upper layer made of the inorganic film and the refractive index of the polyimide layer.

In addition, when the polyimide material included in the polyimide layer (substrate layer) is cured at a high temperature of 400° C. or more, optical properties may decrease due to deterioration of the polyimide.

Accordingly, there is a demand for developing a new polyimide that can satisfy high heat resistance and excellent optical properties.

BRIEF SUMMARY OF THE INVENTION

The present disclosure provides a polyimide-based resin film that has high heat resistance and can realize excellent optical properties and dimensional stability.

The present disclosure also provides a substrate for display device and an optical device using the same.

One aspect of the present disclosure provides a polyimide-based resin film comprising a polyimide-based resin including a polyimide repeating unit represented by the following Chemical Formula 1 and a polyimide repeating unit represented by the following Chemical Formula 5, wherein a coefficient of thermal expansion over the range of 100° C. or more and 430° C. or less is 20 ppm/° C. or less.

[Chemical Formula 1]

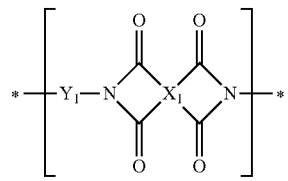

in Chemical Formula 1, $X_1$ is a tetravalent functional group represented by the following Chemical Formula 2, $Y_1$ is an aromatic divalent functional group having 15 or more carbon atoms in which at least one electron-withdrawing group is substituted,

[Chemical Formula 2]

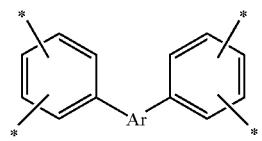

in Chemical Formula 2, Ar is a polycyclic aromatic divalent functional group,

[Chemical Formula 5]

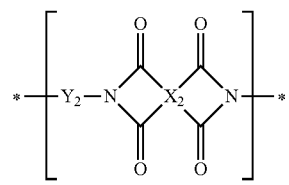

in Chemical Formula 5, $X_2$ is one of the tetravalent functional groups represented by the following Chemical Formula 6, and $Y_2$ is an aromatic divalent functional group having 15 or more carbon atoms in which at least one electron-withdrawing group is substituted,

[Chemical Formula 6]

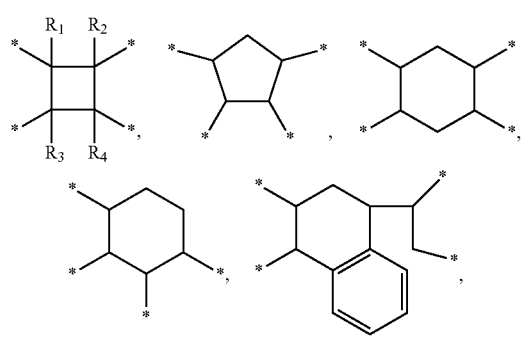

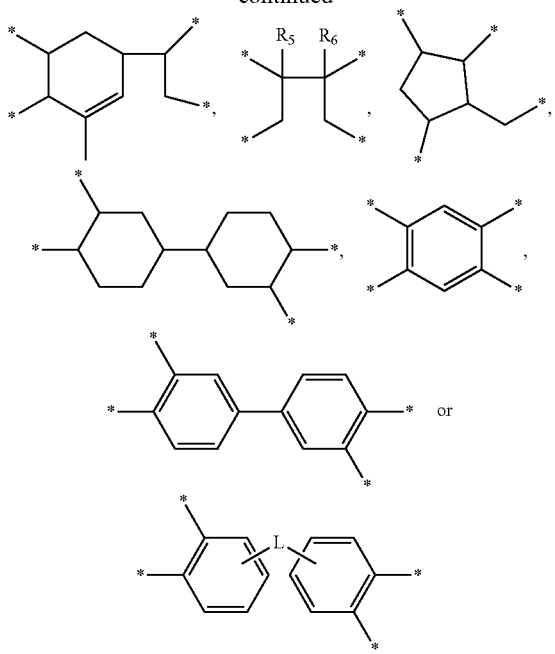

in Chemical Formula 6, $R_1$ to $R_6$ are each independently hydrogen or an alkyl group having 1 to 6 carbon atoms, L is any one selected from the group consisting of a single bond, —O—, —CO—, —COO—, —S—, —SO—, —SO$_2$—, —CR$_7$R$_8$—, —(CH$_2$)$_t$—, —O(CH$_2$)$_t$O—, —COO(CH$_2$)$_t$OCO—, —CONH—, phenylene or a combination thereof, where $R_7$ and $R_8$ are each independently one of hydrogen, an alkyl group having 1 to 10 carbon atoms, or a haloalkyl group having 1 to 10 carbon atoms, and t is an integer of 1 to 10.

Another aspect of the present disclosure provides a substrate for display device comprising the polyimide-based resin film.

A further aspect of the present disclosure provides an optical device comprising the polyimide-based resin film.

DETAILED DESCRIPTION OF THE INVENTION

Hereinafter, a polyimide-based resin film according to specific embodiments of the present disclosure, a substrate for a display device and an optical device using the same will be described in more detail.

Unless otherwise specified throughout this specification, the technical terms used herein are only for reference to specific embodiments and is not intended to limit the present disclosure.

The singular forms "a", "an", and "the" used herein include plural references unless the context clearly dictates otherwise.

The term "including" or "comprising" used herein specifies a specific feature, region, integer, step, action, element and/or component, but does not exclude the presence or addition of a different specific feature, region, integer, step, action, element, component and/or group.

The terms including ordinal numbers such as "a first", "a second", etc. are used only for the purpose of distinguishing one component from another component, and are not limited by the ordinal numbers. For instance, a first component may be referred to as a second component, or similarly, the second component may be referred to as the first component, without departing from the scope of the present invention.

In the present specification, the (co)polymer means including both a polymer and a copolymer, the polymer means a homopolymer consisting of a single repeating unit, and the copolymer means a composite polymer containing two or more repeating units.

In the present specification, examples of the substituents are described below, but are not limited thereto.

In the present specification, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

In the present specification, the term "substituted or unsubstituted" means being unsubsututed or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

In the present specification, the notation ⁃⁞⁃, or ⎯⎯⁃ means a bond linked to another substituent group, and a direct bond means the case where no other atoms exist in the parts represented as L.

In the present specification, aromatic is a property that satisfies Huckle's Rule, and a compound can be defined as aromatic if all of the following three conditions are satisfied according to Huckle's Rule.

1) There must be 4n+2 electrons that are completely conjugated by empty p-orbitals, unsaturated bonds, lone electron pairs, etc.
2) 4n+2 electrons have to form planar isomers and form a ring structure.
3) All atoms of the ring have to be able to participate in conjugation.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl and the like, but are not limited thereto. The alkyl group may be substituted or unsubstituted, and when substituted, examples of the substituent are the same as described above.

In the present specification, the haloalkyl group means a functional group in which the above-described alkyl group is substituted by a halogen group, and examples of halogen group are fluorine, chlorine, bromine or iodine. The haloalkyl group may be substituted or unsubstituted, and when substituted, examples of the substituent are the same as described above.

In the present specification, a multivalent functional group is a residue in which a plurality of hydrogen atoms bonded to an arbitrary compound are removed, and for example, it may be a divalent functional group, a trivalent functional group, and a tetravalent functional group. As an example, a tetravalent functional group derived from a cyclobutane means a residue in which any four hydrogen atoms bonded to the cyclobutane are removed.

In the present specification, the electron-withdrawing group may include one or more selected from the group consisting of a haloalkyl group, a halogen group, a cyano group, a nitro group, a sulfonic acid group, a carbonyl group, and a sulfonyl group, and preferably, it may be a haloalkyl group such as trifluoromethyl group ($-CF_3$).

In the present specification, a direct bond or a single bond means being connected to a bond line in which no atoms or atomic groups exist at the corresponding position. Specifically, it means the case where no other atoms exist in the parts represented as $L_1$, or $L_2$ in Chemical Formula.

In the present specification, the weight average molecular weight means a weight average molecular weight in terms of polystyrene measured by GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement condition are as follows: Waters PL-GPC220 instrument with Polymer Laboratories PLgel MIX-B, 300 mm column was used, the evaluation temperature was 160° C., 1,2,4-trichlorobenzene was used as a solvent, the flow rate is 1 mL/min, samples were prepared at a concentration of 10 mg/10 mL and then fed in an amount of 200 μL, and the values of Mw could be determined using a calibration curve formed using a polystyrene standard. The molecular weight of the polystyrene standards used herein was 9 types of 2,000/10,000/30,000/70,000/200,000/700,000/2,000,000/4,000,000/10,000,000.

Hereinafter, the present disclosure will be described in more detail.

1. Polyimide Film

According to one embodiment of the present disclosure, there can be provided a polyimide-based resin film comprising a polyimide-based resin including a polyimide repeating unit represented by Chemical Formula 1 and a polyimide repeating unit represented by Chemical Formula 5, wherein a coefficient of thermal expansion over the range of 100° C. or more and 430° C. or less is 20 ppm/° C. or less.

The present inventors have found through experiments that as in the polyimide-based resin film of the embodiment, a tetravalent functional group derived from tetracarboxylic dianhydride and a divalent functional group having 15 or more carbon atoms in which at least one electron-withdrawing group is substituted, having a specific structure as shown in Chemical Formula 2 and Chemical Formula 6, are contained within the polyimide-based repeating unit structure, and thereby, the polyimide resin film subjected to curing at a high temperature of 400° C. or more can realize excellent optical properties and dimensional stability, thereby completing the present disclosure.

In particular, since the polyimide-based resin includes a reaction product obtained through imidization reaction of a tetracarboxylic dianhydride containing a structure represented by Chemical Formula 2, a tetracarboxylic dianhydride containing a structure represented by Chemical Formula 6 and an aromatic diamine having 15 or more carbon atoms in which at least one electron-withdrawing group is substituted, it is considered that high heat resistance and excellent optical properties and dimensional stability are realized by the physical and chemical action according to the novel structure of the acid anhydride monomer and the aromatic diamine monomer.

Specifically, a polyimide-based resin synthesized from an aromatic diamine monomer having 15 or more carbon atoms in which at least one electron-withdrawing group is substituted improves the ordering and orientation properties between molecules and ensure sufficient heat resistance even in the polyimide film obtained by high temperature curing, and when this is used as a plastic substrate, it can prevent the plastic substrate from being damaged by heat when heat treating the metal layer formed on the plastic substrate, and also can suppress the occurrence of warpage of a metal thin film formed on the plastic substrate.

Further, a trifluorolumethyl group ($-CF_3$) capable of imparting an electron withdrawing effect is introduced as a substituent into a diamine monomer compound used for the synthesis of a polyimide resin, to thereby suppress the formation of charge transfer complex (CTC) of Pi-electrons existing in the imide chain, through which it is possible to secure transparency and realize excellent optical properties.

Specifically, the polyimide film according to the present disclosure can increase the refractive index, can be used as a substrate layer in the flexible display device, and can reduce the difference in refractive index with each layer constituting the device, from which the amount of light internally dissipated is reduced and the efficiency of bottom emission can be effectively increased.

In addition, the polyimide film according to the present disclosure has a property capable of reducing optical properties and reducing a high value of strain (coefficient of thermal expansion) due to deterioration at the time of curing at a high temperature of 400° C. or more.

The polyimide-based resin is meant to include both a polyimide, and a precursor polymer thereof such as polyamic acid or polyamic acid ester. That is, the polyimide-based polymer may include one or more selected from the group consisting of a polyamic acid repeating unit, a polyamic acid ester repeating unit, and a polyimide repeating unit. That is, the polyimide-based polymer may include one type of polyamic acid repeating unit, one type of polyamic acid ester repeating unit, one type of polyimide repeating unit, or a copolymer in which these two or more types of repeating units are mixed.

The one or more repeating units selected from the group consisting of a polyamic acid repeating unit, a polyamic acid ester repeating unit, and a polyimide repeating unit may form a main chain of the polyimide-based polymer.

In particular, the polyimide-based resin may include a polyimide repeating unit represented by Chemical Formula 1 and a polyimide repeating unit represented by Chemical Formula 5.

In Chemical Formula 1, $X_1$ is a tetravalent functional group represented by Chemical Formula 2, the $X_1$ is a functional group derived from a tetracarboxylic dianhydride compound used in the synthesis of a polyimide-based resin.

In Chemical Formula 2, Ar is a polycyclic aromatic divalent functional group. The polycyclic aromatic divalent functional group is a divalent functional group derived from a polycyclic aromatic hydrocarbon compound or a derivative compound thereof, and may include a fluorenylene group. The derivative compound includes all compounds in which one or more substituents are introduced or a carbon atom is replaced with a heteroatom.

More specifically, in Ar of Chemical Formula 2, the polycyclic aromatic divalent functional group may include a fused cyclic divalent functional group containing at least two or more aromatic cyclic compounds. That is, the polycyclic aromatic divalent functional group may contain at least two or more aromatic ring compounds in the functional group structure, and also the functional group may have a fused ring structure.

The aromatic cyclic compound may include an arene compound containing one or more benzene rings, or a hetero arene compound in which carbon atoms in the arene compound are replaced with heteroatoms.

The aromatic cyclic compound may contain at least two or more in the polycyclic aromatic divalent functional group, and each of the two or more aromatic cyclic compounds may directly form a fused ring, or may form a fused ring via another ring structure. As an example, when two benzene rings are each fused to a cycloalkyl ring structure, it may be defined that two benzene rings form a fused ring via each cycloalkyl ring.

The fused cyclic divalent functional group containing at least two or more aromatic cyclic compounds is a divalent functional group derived from a fused cyclic compound or a derivative compound thereof containing at least two or more aromatic cyclic compounds, and the derivative compound includes all compounds in which one or more substituents are introduced or a carbon atom is replaced with a heteroatom.

Examples of the polycyclic aromatic divalent functional group are not particularly limited, but as an example, a fluorenylene group can be mentioned.

Examples of the tetravalent functional group represented by Chemical Formula 2 includes a functional group represented by the following Chemical Formula 2-1.

[Chemical Formula 2-1]

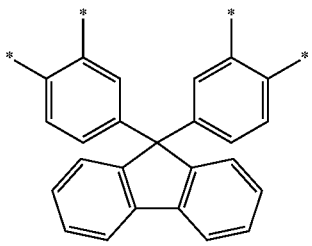

In Chemical Formula 1, $Y_1$ is an aromatic divalent functional group having 15 or more carbon atoms in which at least one electron-withdrawing group is substituted, the $Y_1$ may be a functional group derived from a diamine compound used in the synthesis of polyamic acid, polyamic acid ester, or polyimide.

In the $Y_1$, the aromatic divalent functional group having 15 or more carbon atoms may include three or more aromatic cyclic compounds. As three or more aromatic cyclic compounds are contained in this way, the polyimide-based resin has improved ordering and orientation properties between molecules, and thus, it can ensure sufficient heat resistance even in a polyimide film obtained by high-temperature curing.

The aromatic divalent functional group having 15 or more carbon atoms may include one or more selected from the group consisting of a triphenylene group, a quarterphenylene group, and a pentaphenylene group.

The electron-withdrawing group may include one or more selected from the group consisting of a haloalkyl group, a halogen group, a cyano group, a nitro group, a sulfonic acid group, a carbonyl group, and a sulfonyl group.

As an electron-withdrawing substituent such as trifluoromethyl group ($-CF_3$) having high electronegativity are substituted, the effect of suppressing the formation of CTC (charge transfer complex) of Pi-electrons present in the polyimide resin chain is increased, thereby ensuring improved transparency. That is, the packing in the polyimide structure or between the chains can be reduced, and due to steric hindrance and electrical effects, it is possible to weaken the electrical interaction between the chromophores and show high transparency in the visible region.

More specifically, the aromatic divalent functional group having 15 or more carbon atoms in which at least one electron-withdrawing functional group of the $Y_1$ is substituted may include a functional group represented by the following Chemical Formula 3.

[Chemical Formula 3]

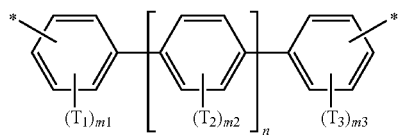

in Chemical Formula 3, $T_1$ to $T_3$ are the same as or different from each other, and each independently, an electron-withdrawing group, m1 to m3 are the same as or different from each other, at least one of m1 to m3 is an integer of 1 to 4, the rest are an integer of 0 to 4, and n is an integer of 1 to 10.

The aromatic divalent functional group having 15 or more carbon atoms in which at least one electron withdrawing group of the $Y_1$ is substituted may include a functional group represented by the following Chemical Formula 3-1.

[Chemical Formula 3-1]

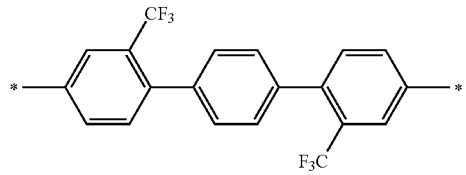

The polyimide-based resin may include a combination of a tetracarboxylic dianhydride represented by the following Chemical Formula 4 and an aromatic diamine having 15 or more carbon atoms in which at least one electron withdrawing group is substituted.

[Chemical Formula 4]

in Chemical Formula 4, Ar' is a polycyclic aromatic divalent functional group. The polycyclic aromatic divalent functional group is a divalent functional group derived from a polycyclic aromatic hydrocarbon compound or a derivative compound thereof, and may include a fluorenylene group. The derivative compound includes all compounds in which one or more substituents are introduced or a carbon atom is replaced with a heteroatom.

Specific examples of the tetracarboxylic dianhydride represented by Chemical Formula 4 include 9,9-bis(3,4-dicarboxyphenyl)fluorene dianhydride (BPAF).

The aromatic diamine having 15 or more carbon atoms in which at least one electron-withdrawing group is substituted is a compound in which an amino group (—$NH_2$) is bonded to both terminals of the aromatic divalent functional group having 15 or more carbon atoms in which at least one of the above-mentioned electron-withdrawing groups is substituted. Details of the aromatic divalent functional group having 15 or more carbon atoms in which at least one of the above-mentioned electron-withdrawing groups is substituted are the same as described above.

Specific examples of the aromatic diamine having 15 or more carbon atoms in which at least one electron-withdrawing group is substituted may include a diamine represented by the following Chemical Formula a.

[Chemical Formula a]

More specifically, in the polyimide-based resin, a bond between the nitrogen atom of the amino group and the carbon atom of the anhydride group may be formed by a reaction between a terminal anhydride group (—OC—O—CO—) of the tetracarboxylic dianhydride represented by Chemical Formula 4, and a terminal amino group (—$NH_2$) of the aromatic diamine having 15 or more carbon atoms in which at least one of the electron withdrawing group is substituted.

Further, the polyimide-based resin may further include a polyimide repeating unit represented by the following Chemical Formula 5.

[Chemical Formula 5]

in Chemical Formula 5, $X_2$ is one of the tetravalent functional groups represented by the following Chemical Formula 6, and $Y_2$ is an aromatic divalent functional group having 15 or more carbon atoms in which at least one electron-withdrawing group is substituted,

[Chemical Formula 6]

in Chemical Formula 6, $R_1$ to $R_6$ are each independently hydrogen or an alkyl group having 1 to 6 carbon atoms, L is any one selected from the group consisting of a single bond, —O—, —CO—, —COO—, —S—, —SO—, —$SO_2$—, —$CR_7R_8$—, —$(CH_2)_t$—, —$O(CH_2)_tO$—, —$COO(CH_2)_tOCO$—, —CONH—, phenylene or a combination thereof, where $R_7$ and $R_8$ are each independently one of hydrogen, an alkyl group having 1 to 10 carbon atoms, or a haloalkyl group having 1 to 10 carbon atoms, and t is an integer of 1 to 10.

Specific examples of the functional group represented by Chemical Formula 6 include a functional group represented by the following Chemical Formula 6-1, or a functional group represented by the following Chemical Formula 6-2.

[Chemical Formula 6-1]

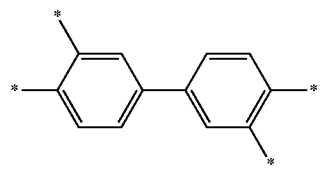

[Chemical Formula 6-2]

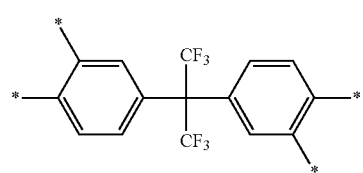

In particular, when the functional group represented by Chemical Formula 6-1, or the functional group represented by Chemical Formula 6-2 is included, the polyimide-based polymer exhibits excellent optical properties, and such optical properties may be technically advantageous in terms of improving YI and enhancing transmittance.

That is, the polyimide-based polymer may include a first repeating unit containing a repeating unit represented by Chemical Formula 1 wherein the repeating unit derived from tetracarboxylic dianhydride is a functional group represented by Chemical Formula 2; and a second repeating unit containing a repeating unit represented by Chemical Formula 5 wherein the repeating unit derived from tetracarboxylic dianhydride is a functional group represented by Chemical Formula 6. The first repeating unit and the second repeating unit can be randomly arranged in the polyimide-based polymer to form a random copolymer, or form a block copolymer by forming a block of the first repeating unit and a block of the second repeating unit.

The polyimide-based polymer including the repeating unit represented by Chemical Formula 1 and the repeating unit represented by Chemical Formula 5 can be prepared by reacting two or more different tetracarboxylic dianhydride compounds with a diamine compound, and the two types of tetracarboxylic dianhydrides can be added simultaneously to synthesize a random copolymer, or can be added sequentially to synthesize a block copolymer.

The polyimide repeating unit represented by Chemical Formula 5 may be contained in an amount of 1 mol % or more and 99 mol % or less with respect to the total repeating units contained in the polyimide-based resin.

The polyimide repeating unit represented by Chemical Formula 1 and the polyimide repeating unit represented by Chemical Formula 5 may be contained in an amount of 70 mol % or more, or 80 mol % or more, or 90 mol % or more, or 70 mol % or more and 100 mol % or less, 80 mol % or more and 100 mol % or less, 70 mol % or more and 90 mol % or less, 70 mol % or more and 99 mol % or less, 80 mol % or more and 99 mol % or less, 90 mol % or more and 99 mol % or less with respect to the total repeating units contained in the polyimide-based resin.

That is, the polyimide-based resin is composed of only the polyimide repeating unit represented by Chemical Formula 1 and the polyimide repeating unit represented by Chemical Formula 5, or most thereof can be composed of the polyimide repeating unit represented by Chemical Formula 1 and the polyimide repeating unit represented by Chemical Formula 5.

More specifically, the polyimide-based resin may not be mixed with other diamines in addition to diamines capable of inducing aromatic divalent functional groups having 15 or more carbon atoms in which at least one of the electron-withdrawing group is substituted, or may be mixed in an extremely small amount of less than 1 mol %.

More specifically, the polyimide repeating unit represented by Chemical Formula 5 may include one or more repeating units selected from the group consisting of a polyimide repeating unit represented by the following Chemical Formula 5-1, and a polyimide repeating unit represented by the following Chemical Formula 5-2.

[Chemical Formula 5-1]

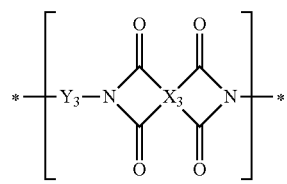

in Chemical Formula 5-1, $X_3$ is a tetravalent functional group represented by Chemical Formula 6-1, and $Y_3$ is an aromatic divalent functional group having 15 or more carbon atoms in which at least one electron-withdrawing group is substituted,

[Chemical Formula 5-2]

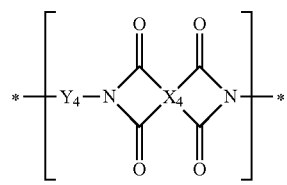

in Chemical Formula 5-2, $X_4$ is a tetravalent functional group represented by Chemical Formula 6-2, and $Y_4$ is an aromatic divalent functional group having 15 or more carbon atoms in which at least one electron-withdrawing group is substituted.

The weight average molecular weight (measured by GPC) of the polyimide-based resin is not particularly limited, but may be, for example, 1000 g/mol or more and 200000 g/mol or less, or 10000 g/mol or more and 200000 g/mol or less.

Because the polyimide-based resin according to the present disclosure can exhibit excellent colorless and transparent properties while maintaining properties such as heat resistance and mechanical strength as they are due to a rigid structure, it can be used in a diverse range of fields such as device substrate, display cover substrate, optical film, integrated circuit (IC) package, adhesive film, multilayer FRC (flexible printed circuit), tape, touch panel, protective polymer film for optical disc, etc. In particular, it can be suitable for display cover substrate.

Meanwhile, the polyimide-based resin film of the one embodiment may include a cured product in which the polyimide-based resin is cured at a temperature of 400° C. or more. The cured product means a material obtained through a curing step of the resin composition containing the polyimide-based resin, and the curing process may be performed at a temperature of 400° C. or more, or 400° C. or more and 500° C. or less.

More specifically, examples of the method of synthesizing the polyimide-based resin film are not particularly limited, and, for example, a method of manufacturing a film including a step of coating a resin composition containing the polyimide-based resin onto a substrate to form a coating film (step 1); a step of drying the coating film (step 2); and a step of heat-treating and curing the dried coating film (step 3) can be used.

Step 1 is a step of coating the resin composition containing the above-mentioned polyimide-based resin onto a substrate to form a coating film. The method of coating the resin composition containing the polyimide-based resin onto a substrate is not particularly limited, and for example, a method such as screen printing, offset printing, flexographic printing, inkjet, and the like can be used.

Further, the resin composition containing the polyimide-based resin may be in the form dissolved or dispersed in an organic solvent. In the case of having such form, for example, when the polyimide-based resin is synthesized in the organic solvent, the solution may be the reaction solution thus obtained itself or a solution obtained by diluting the reaction solution with another solvent. Further, when the polyimide-based resin is obtained as powder, the solution may be a solution obtained by dissolving the powder in an organic solvent.

Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

The resin composition containing the polyimide-based resin may include the solid in such an amount that the solution has an appropriate viscosity in consideration of processability such as a coating property during the film forming process. For example, the content of the composition may be adjusted so that the total content of the resin is 5% by weight or more and 25% by weight or less, or may be adjusted to 5% by weight or more and 20% by weight or less, or 5% by weight or more and 15% by weight or less.

In addition, the resin composition containing the polyimide-based resin may further include other components in addition to the organic solvent. In a non-limiting example, when the resin composition containing the polyimide-based resin is coated, additives capable of improving the uniformity of the film thickness and the surface smoothness, or improving the adhesion with a substrate, or changing the dielectric constant and conductivity, or increasing the denseness, may be further included. Examples of these additives include surfactants, silane-based compounds, dielectrics or crosslinking compounds, etc.

Step 2 is a step of drying the coating film formed by coating a resin composition containing the polyimide-based resin onto a substrate.

The step of drying the coating film may be performed by a heating means such as a hot plate, a hot-air circulation furnace, an infrared furnace and the like, and the drying may be performed at a temperature of 50° C. or more and 150° C. or less, or 50° C. or more and 100° C. or less.

Step 3 is a step of heat-treating and curing the dried coating film. In this case, the heat treatment may be performed by a heating means such as a hot plate, a hot-air circulation furnace, an infrared furnace and the like, and the heat treatment can be performed at a temperature of 400° C. or more, or 400° C. or more and 500° C. or less.

The thickness of the polyimide-based resin film is not particularly limited, but for example, it can be freely adjusted within the range of 0.01 μm or more and 1000 μm or less. If the thickness of the polyimide-based resin film increases or decreases by a specific value, the physical properties measured in the polyimide-based resin film may also change by a certain value.

The polyimide—based resin film may have a coefficient of thermal expansion of 20 ppm/° C. or less, or 0.1 ppm/° C. or more and 20 ppm/° C. or less, or 1 ppm/° C. or more and 20 ppm/° C. or less over the range of 100° C. or more and 430° C. or less. The range of 100° C. or more and 430° C. or less may mean a temperature range of 100° C. or more and 430° C. or less.

The coefficient of thermal expansion is obtained by measuring the aspect of the change in thermal expansion using TMA (Q400, TA Instruments) at the time when setting the pulling force of the polyimide-based resin film sample to 0.01N or more and 0.1 N or less, or 0.01 N or more and 0.05N or less, performing a primary heating step at a heating rate of 1'C/min to 10° C./min in a temperature range of 100° C. or more and 430° C. or less, or 4° C./min or more and 6° C./min or less, and then performing a cooling at a cooling rate of 1° C./min or more and 10° C./min or less, or 3'C/min or more and 5° C./min or less in a temperature range from 430° C. to 100° C.

The coefficient of thermal expansion may be measured from the polyimide film sample having a thickness of 10±2 μm. When the thickness of the polyimide film increases or decreases by a specific value, the physical properties measured from the polyimide film may also change by a certain value.

As the polyimide-based resin film satisfies the coefficient of thermal expansion of 20 ppm/° C. or less over the range of 100° C. or more and 430° C. or less, it can ensure sufficient heat resistance even in the polyimide film obtained by high temperature curing, and when this is used as a plastic substrate, it can prevent the plastic substrate from being damaged by heat when heat treating the metal layer formed on the plastic substrate, and also can suppress the occurrence of warpage of a metal thin film formed on the plastic substrate.

Further, a trifluorolumethyl group ($-CF_3$) capable of imparting an electron withdrawing effect is introduced as a substituent into a diamine monomer compound used for the synthesis of a polyimide resin, to thereby suppress the formation of charge transfer complex (CTC) of Pi-electrons existing in the imide chain, through which it is possible to secure transparency and realize excellent optical properties.

Specifically, the polyimide-based resin film may have a haze value of 2% or less, or 0.1% or more and 2% or less. In addition, the polyimide-based resin film may have a yellow index value of 15 or less, or 1 or more and 15 or less.

The haze may be measured from the polyimide film sample having a thickness of 10±2 μm. When the thickness of the polyimide film increases or decreases by a specific value, the physical properties measured in the polyimide film may also change by a certain value.

Further, the polyimide-based resin film may have an average transmittance of 60% or more, or 60% or more and 99% or less in a wavelength range of 380 nm or more and 780 nm or less. Further, the polyimide-based resin film may have a transmittance of 80% or more, or 80% or more and 99% or less at a wavelength of 550 nm.

The transmittance may be measured from the polyimide film sample having a thickness of 10±2 μm. When the thickness of the polyimide film increases or decreases by a specific value, the physical properties measured in the polyimide film may also change by a certain value.

2. Substrate for Display Device

Meanwhile, according to another embodiment of the present disclosure, there can be provided a substrate for display device including the polyimide-based resin film of the other embodiment. Details of the polyimide-based resin film may include all of the contents described above in the one embodiment.

The display device including the substrate may include a liquid crystal display device (LCD), an organic light emitting diode (OLED), a flexible display), a rollable display or foldable display, or the like.

The display device may have various structures according to an application field and a specific shape, and may include, for example, a cover plastic window, a touch panel, a polarizing plate, a barrier film, a light emitting device (such as an OLED device), a transparent substrate, or the like.

The polyimide-based resin film of another embodiment described above may be used in various applications such as a substrate, an outer protective film or a cover window in such various display devices, and more specifically, may be applied to a substrate.

For example, the display device substrate may have a structure in which a device protective layer, a transparent electrode layer, a silicon oxide layer, a polyimide-based resin film, a silicon oxide layer, and a hard coating layer are sequentially stacked.

The transparent polyimide substrate may further include a silicon oxide layer formed between the transparent polyimide-based resin film and the cured layer in order to further improve the solvent resistance, water permeability and optical properties thereof, and the silicon oxide layer may be produced by curing polysilazane.

Specifically, the silicon oxide layer may, before forming a coating layer on at least one surface of the transparent polyimide-based resin film, be formed by curing the coated polysilazane after coating and drying a solution containing polysilazane The substrate for a display device according to the present disclosure can provide a transparent polyimide cover substrate having solvent resistance, optical properties, water permeability and scratch resistance while having excellent warpage properties and impact resistance by including the above-described device protective layer.

3. Optical Device

Meanwhile, according to another embodiment of the present disclosure, there can be provided an optical device including the polyimide-based resin film of the other embodiment. Details of the polyimide-based resin film may include all of those described above in the one embodiment.

The optical device may include all kinds of devices using properties realized by light, and may be, for example, a display device. Specific examples of the display device include a liquid crystal display device (LCD), an organic light emitting diode (OLED), a flexible display, a rollable display or foldable display device, or the like, but is not limited thereto.

The optical device may have various structures according to the application field and the specific shape, and for example, it may have a structure including a cover plastic window, a touch panel, a polarizing plate, a barrier film, a light emitting device (such as an OLED device), a transparent substrate, or the like.

The polyimide-based resin film of another embodiment described above may be used in various applications such as a substrate, an outer protective film or a cover window in various optical devices, and more specifically, may be applied to a substrate.

Advantageous Effects

According to the present disclosure, a polyimide-based resin film that has low discoloration even during long-term storage, can exhibit excellent light transmittance when applied to a liquid crystal aligning film, and can achieve improved alignment and electrical properties, a substrate for display device, and an optical device using the same can be provided.

Hereinafter, embodiments of the present disclosure will be described in more detail by way of examples. However, these examples are provided for illustrative purposes only, and are not intended to limit the scope of the present disclosure.

<Example: Preparation of Polyimide Film>

Example 1

(1) Preparation of Polyimide Precursor Composition

The organic solvent DEAc was filled in a reactor under a stream of nitrogen, and then 0.735 mol of a diamine represented by the following Chemical Formula a was added and dissolved at the same temperature while maintaining the temperature of the reactor to 25° C. To the solution to which the diamine represented by the following Chemical Formula a was added, 0.3675 mol of 9,9-bis(3,4-dicarboxyphenyl)fluorene dianhydride (BPAF) represented by Chemical Formula b and 0.3675 mol of 3,3',4,4'-biphenyltetracarboxylic dianhydride (BPDA) were added as an acid dianhydride at the same temperature, and stirred for 24 hours to give a polyimide precursor composition.

[Chemical Formula a]

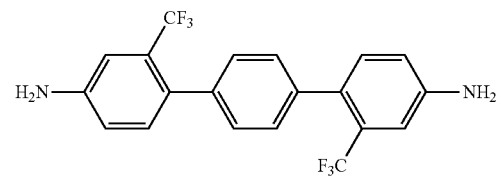

-continued

[Chemical Formula b]

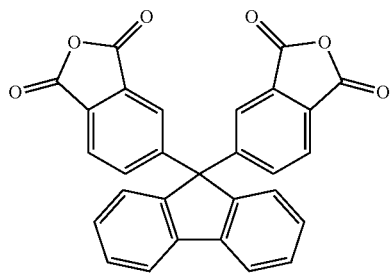

(2) Preparation of Polyimide Film

The polyimide precursor composition was spin coated on a glass substrate. The polyimide precursor composition-coated glass substrate was put in an oven and heated at a rate of 5° C./min, and a curing process was performed by maintaining at 80° C. for 30 minutes and at 450° C. for 30 minutes, thereby preparing a polyimide film having a thickness of 10 μm.

Example 2

A polyimide film was prepared in the same manner as in Example 1, except that 4,4'-(hexafluoroisopropylidene) diphthalic anhydride (6-FDA) was used as acid dianhydride instead of 3,3',4,4-Biphenyltetracarboxylic dianhydride (BPDA).

Comparative Example: Preparation of Polyimide Film

Comparative Example 1

(1) Preparation of Polyimide Precursor Composition

The organic solvent DEAc was filled in a reactor under a stream of nitrogen, and then 0.735 mol of 2,2'-bis(trifluoromethyl)benzidine (TFMB) was added and dissolved at the same temperature while maintaining the temperature of the reactor to 25° C. To the solution to which 2,2'-bis(trifluoromethyl)benzidine (TFMB) was added, 0.735 mol of 3,3', 4,4'-Biphenyltetracarboxylic dianhydride (BPDA) was added as an acid dianhydride at the same temperature, and stirred for 24 hours to give a polyimide precursor composition.

(2) Preparation of Polyimide Film

The polyimide precursor composition was spin coated on a glass substrate. The polyimide precursor composition-coated glass substrate was put in an oven and heated at a rate of 5° C./min, and a curing process was performed by maintaining at 80° C. for 30 minutes and at 450° C. for 30 minutes, thereby preparing a polyimide film having a thickness of 10 μm.

Comparative Example 2

A polyimide film was prepared in the same manner as in Example 1, except that 0.3675 mol of 3,3',4,4'-biphenyltetracarboxylic dianhydride (BPDA) and 0.3675 mol of 4,4'-(hexafluoroisopropylidene)diphthalic anhydride (6-FDA) were added as an acid dianhydride.

Comparative Example 3

A polyimide film was prepared in the same manner as in Example 1, except that pyromellitic dianhydride (PMDA) was used instead of 3,3',4,4'-Biphenyltetracarboxylic dianhydride (BPDA).

Experimental Example: Measurement of Physical Properties of Polyimide Films Obtained in Examples and Comparative Examples The physical properties of the polyimide films obtained in Examples and Comparative Examples were measured by the following methods, and the results are shown in Table 1 below.

1. Coefficient of Thermal Expansion (CTE)

The film was prepared in a size of 5×20 mm and then a sample was loaded using an accessory. The length of the film actually measured was made the same at 16 mm. The aspect of the change in thermal expansion was measured using TMA (Q400, TA Instruments) at the time when setting the film pulling force to 0.02N, performing a primary heating step at a heating rate of 5° C./min in a temperature range of 100° C. or more and 430° C. or less, and then performing a cooling at a cooling rate of 4° C./min in a temperature range from 430° C. to 100° C. The coefficient of thermal expansion was evaluated under the following criteria.

o: 20 ppm/° C. or less
Δ: more than 20 ppm/° C. and less than 30 ppm/° C.
X: 30 ppm/° C. or more 2. Yellow Index (YI)

The yellow index of the polyimide film was measured using a color meter (Color-Eye 7000A, GRETAGMACBETH) and evaluated under the following criteria.

i: 15 or less
Δ: more than 15 and less than 25
X: 25 or more

2. Haze

The haze value of the polyimide film was measured using Hazemeter (NDI-1-5000), and evaluated under the following criteria.

2% or less
Δ: more than 2% and less than 3%
X: 3% or more

4. Transmittance (1) Average transmittance in the wavelength range of 380 nm or more and 780 nm or less The average transmittance in a wavelength range of 380 nm or more and 780 nm or less was measured with a transmittance meter (model name: HR-100, manufactured by Murakami Color Research Laboratory) based on IS K 7105, and evaluated under the following criteria.

o: 60% or more
Δ: More than 50% and less than 60%
X: 50% or less (2) Transmittance at a single wavelength of 550 nm The transmittance at a wavelength of 550 nm was measured with a transmittance meter (model name: HR-100, manufactured by Murakami Color Research Laboratory) based on JISK7105, and evaluated under the following criteria.

o: 80% or more
Δ: more than 60% and less than 80%
X: 60% or less

TABLE 1

Experimental Example Measurement Results of Examples and Comparative Examples

| Category | CTE (ppm/° C.) | YI | Haze (%) | Transmittance(%) @380~780 | Transmittance (%) @550 |
|---|---|---|---|---|---|
| Example 1 | ○ | ○ | ○ | ○ | ○ |
| Example 2 | ○ | ○ | ○ | ○ | ○ |
| Comparative Example 1 | X | ○ | X | ○ | Δ |
| Comparative Example 2 | X | Δ | Δ | ○ | ○ |
| Comparative Example 3 | ○ | Δ | ○ | Δ | Δ |

As shown in Table 1, it was confirmed that not only the polyimide film obtained in Examples has a CTE value of 20 ppm/° C. or less, which is lower than the value of 30 ppm/° C. or more in Comparative Examples 1 and 2, thus having excellent heat resistance, but also it has a haze value of 2% or less, which is lower than the value of more than 2% in Comparative Examples 1 and 2, thus having excellent optical properties with improved transparency. On the other hand, it was confirmed that not only the polyimide film obtained in Examples has a yellow index (YI) of 15 or less, which is lower than the yellow index of more than 15 and less than 25 in Comparative Example 3, but also it has a higher value than Comparative Example 3 even in terms of transmittance, thus having excellent optical properties.

The invention claimed is:

1. A polyimide-based resin film comprising a polyimide-based resin including a polyimide repeating unit represented by Chemical Formula 1 and a polyimide repeating unit represented by Chemical Formula 5,
wherein a coefficient of thermal expansion over the range of 100° C. or more and 430° C. or less is 20 ppm/° C. or less:

[Chemical Formula 1]

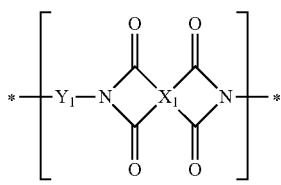

in the Chemical Formula 1, $X_1$ is a tetravalent functional group represented by Chemical Formula 2,
$Y_1$ is the same as or different from $Y_2$ and is an aromatic divalent functional group having at least 15 carbon atoms in which at least one electron-withdrawing group is substituted,

[Chemical Formula 2]

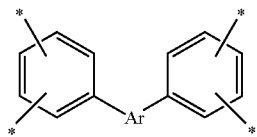

in the Chemical Formula 2, Ar is a polycyclic aromatic divalent functional group,

[Chemical Formula 5]

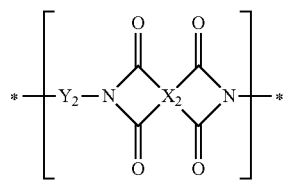

in the Chemical Formula 5,
$X_2$ is one of the tetravalent functional groups represented by the following Chemical Formula 6, and
$Y_2$ is the same as or different from $Y_1$ and is an aromatic divalent functional group having at least 15 carbon atoms in which at least one electron-withdrawing group is substituted,

[Chemical Formula 6]

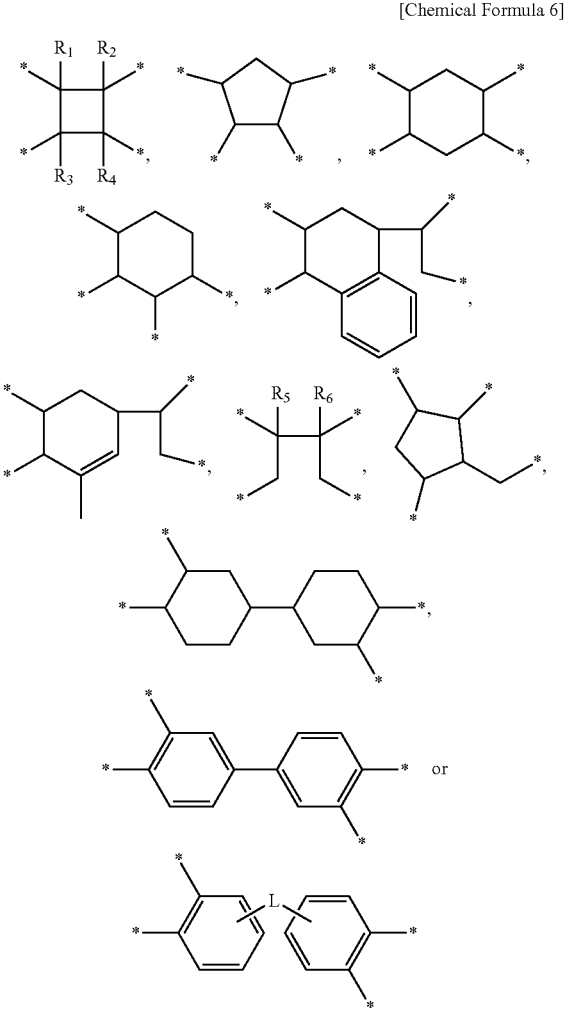

in the Chemical Formula 6, $R_1$ to $R_6$ are each independently hydrogen or an alkyl group having 1 to 6 carbon atoms, each L is independently a single bond, —O—, —CO—, —COO—, —S—, —SO—, —SO$_2$—, —CR$_7$R$_8$—, —(CH$_2$)$_t$—, —O(CH$_2$)$_t$O—, —COO(CH$_2$)$_t$OCO—, —CONH—, or phenylene, where $R_7$ and $R_8$ are each independently hydrogen, an alkyl group having 1 to 10 carbon atoms, or a haloalkyl group having 1 to 10 carbon atoms, and t is an integer of 1 to 10, and wherein the aromatic divalent functional group of $Y_1$ includes a functional group represented by Chemical Formula 3:

[Chemical Formula 3]

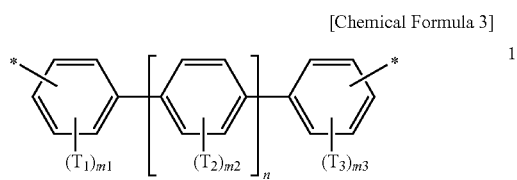

in the Chemical Formula 3, $T_1$ to $T_3$ are the same as or different from each other, and each independently, an electron-withdrawing group, m1 to m3 are the same as or different from each other, at least one of m1 to m3 is an integer of 1 to 4, the rest are an integer of 0 to 4, and n is an integer of 1 to 10.

2. The polyimide-based resin film of claim 1,
wherein the film has a haze value of 2% or less.

3. The polyimide-based resin film of claim 1,
wherein the film has a yellow index value of 15 or less.

4. The polyimide-based resin film of claim 1,
wherein the film has an average transmittance of at least 60% at a wavelength range of 380 nm or more and 780 nm or less.

5. The polyimide-based resin film of claim 1,
wherein the film has a transmittance of at least 80% at a wavelength range of 550 nm.

6. The polyimide-based resin film of claim 1,
wherein the polycyclic aromatic divalent functional group of Ar in the Chemical Formula 2 includes a fused cyclic divalent functional group containing at least two or more aromatic cyclic compounds.

7. The polyimide-based resin film of claim 1,
wherein the polycyclic aromatic divalent functional group of Ar in the Chemical Formula 2 includes a fluorenylene group.

8. The polyimide-based resin film of claim 1,
wherein the tetravalent functional group represented by Chemical Formula 2 includes a functional group represented by the following Chemical Formula 2-1:

[Chemical Formula 2-1]

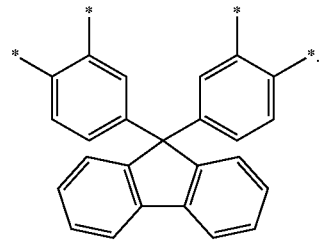

9. The polyimide-based resin film of claim 1,
wherein the electron-withdrawing group in $Y_1$ and $Y_2$ includes at least one group selected from a haloalkyl group, a halogen group, a cyano group, a nitro group, a sulfonic acid group, a carbonyl group, and a sulfonyl group.

10. The polyimide-based resin film of claim 1, wherein the aromatic divalent functional group of $Y_1$ includes a functional group represented by the following Chemical Formula 3-1:

[Chemical Formula 3-1]

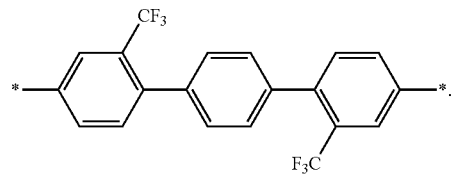

11. The polyimide-based resin film of claim 1,
wherein the polyimide repeating unit represented by Chemical Formula 5 and the polyimide repeating unit represented by Chemical Formula 1 are contained in an amount of 70 mol % or more with respect to the total repeating units contained in the polyimide-based resin.

12. A substrate for display device comprising the polyimide-based resin film of claim 1.

13. An optical device comprising the polyimide-based resin film of claim 1.

* * * * *